(12) United States Patent
Kim et al.

(10) Patent No.: US 12,155,890 B2
(45) Date of Patent: Nov. 26, 2024

(54) DISPLAY APPARATUS AND CONTROL METHOD THEREOF

(71) Applicant: SAMSUNG ELECTRONICS CO., LTD., Suwon-si (KR)

(72) Inventors: Seokhyun Kim, Suwon-si (KR); Heejin Ko, Suwon-si (KR); Hyoseung Park, Suwon-si (KR); Ahyeon Shim, Suwon-si (KR); Chaebin Lee, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/112,316

(22) Filed: Feb. 21, 2023

(65) Prior Publication Data

US 2023/0199244 A1    Jun. 22, 2023

Related U.S. Application Data

(63) Continuation of application No. PCT/KR2021/010424, filed on Aug. 6, 2021.

(30) Foreign Application Priority Data

Aug. 21, 2020   (KR) .................. 10-2020-0105187

(51) Int. Cl.
  *H04N 21/431*   (2011.01)
  *H04N 21/41*    (2011.01)
  *H04N 21/45*    (2011.01)
  *H04N 21/475*   (2011.01)

(52) U.S. Cl.
  CPC ..... *H04N 21/4316* (2013.01); *H04N 21/4104* (2013.01); *H04N 21/4532* (2013.01); *H04N 21/4755* (2013.01); *H04N 21/4756* (2013.01)

(58) Field of Classification Search
  None
  See application file for complete search history.

(56) References Cited

U.S. PATENT DOCUMENTS 9,041,863 B2   5/2015  Wang et al.
9,210,361 B2   12/2015  Todd
(Continued)

FOREIGN PATENT DOCUMENTS

CN   104735477 A   6/2015
CN   109479160 A   3/2019
(Continued)

OTHER PUBLICATIONS

Communication dated Nov. 7, 2023, issued by European Patent Office in European Patent Application No. 21858510.7.
(Continued)

*Primary Examiner* — James R Marandi
(74) *Attorney, Agent, or Firm* — Sughrue Mion, PLLC

(57) ABSTRACT

A display apparatus includes a processor configured to execute instructions to: based on an input from a user, select a category from a plurality of categories related to characteristics of a plurality of source devices connectable to an interface of the display apparatus, receive a plurality of pieces of content from at least one source device connected to the interface and corresponding to the selected category, and display a multi-image on a display of the display apparatus, based on at least two pieces of content from the plurality of pieces of content.

20 Claims, 16 Drawing Sheets

(56) References Cited

U.S. PATENT DOCUMENTS

| | | | |
|---|---|---|---|
| 10,366,132 B2* | 7/2019 | Jiron | H04L 67/535 |
| 10,575,055 B2 | 2/2020 | Richman | |
| 2005/0114901 A1 | 5/2005 | Yui et al. | |
| 2006/0107294 A1* | 5/2006 | Rivlin | H04N 21/485 |
| | | | 348/E5.112 |
| 2008/0163059 A1 | 7/2008 | Craner | |
| 2011/0161814 A1 | 6/2011 | Kim et al. | |
| 2015/0062433 A1 | 3/2015 | Wang et al. | |
| 2015/0172764 A1 | 6/2015 | Chae et al. | |
| 2015/0271434 A1 | 9/2015 | Ezequiel | |
| 2016/0048299 A1 | 2/2016 | Sirpal et al. | |
| 2016/0127764 A1 | 5/2016 | Jung et al. | |
| 2016/0227269 A1 | 8/2016 | Han | |
| 2016/0377877 A1 | 12/2016 | Pijlman | |
| 2018/0027295 A1 | 1/2018 | Lee et al. | |
| 2018/0199101 A1 | 7/2018 | Kim | |
| 2018/0307398 A1 | 10/2018 | Kim et al. | |

FOREIGN PATENT DOCUMENTS

| | | |
|---|---|---|
| JP | 2005-143081 A | 6/2005 |
| JP | 2014-52591 A | 3/2014 |
| KR | 10-2007-0073284 A | 7/2007 |
| KR | 10-2008-0050258 A | 6/2008 |
| KR | 10-2016-0039479 A | 4/2016 |
| KR | 10-1698284 B1 | 1/2017 |
| KR | 10-1721601 B1 | 3/2017 |
| KR | 10-2019-0103775 A | 9/2019 |
| WO | 2014/040626 A1 | 3/2014 |

OTHER PUBLICATIONS

Communication dated Nov. 25, 2021, issued by the International Searching Authority in counterpart International Application No. PCT/KR2021/010424 (PCT/ISA/210).

Communication dated Nov. 25, 2021, issued by the International Searching Authority in counterpart International Application No. PCT/KR2021/010424 (PCT/ISA/237).

Communication issued on Jul. 17, 2024 by the Korean Intellectual Property Office in Korean Patent Application No. 10-2020-0105187.

Communication issued on Jul. 31, 2024 by the China National Intellectual Property Administration in Chinese Patent Application No. 202180051286.4.

* cited by examiner

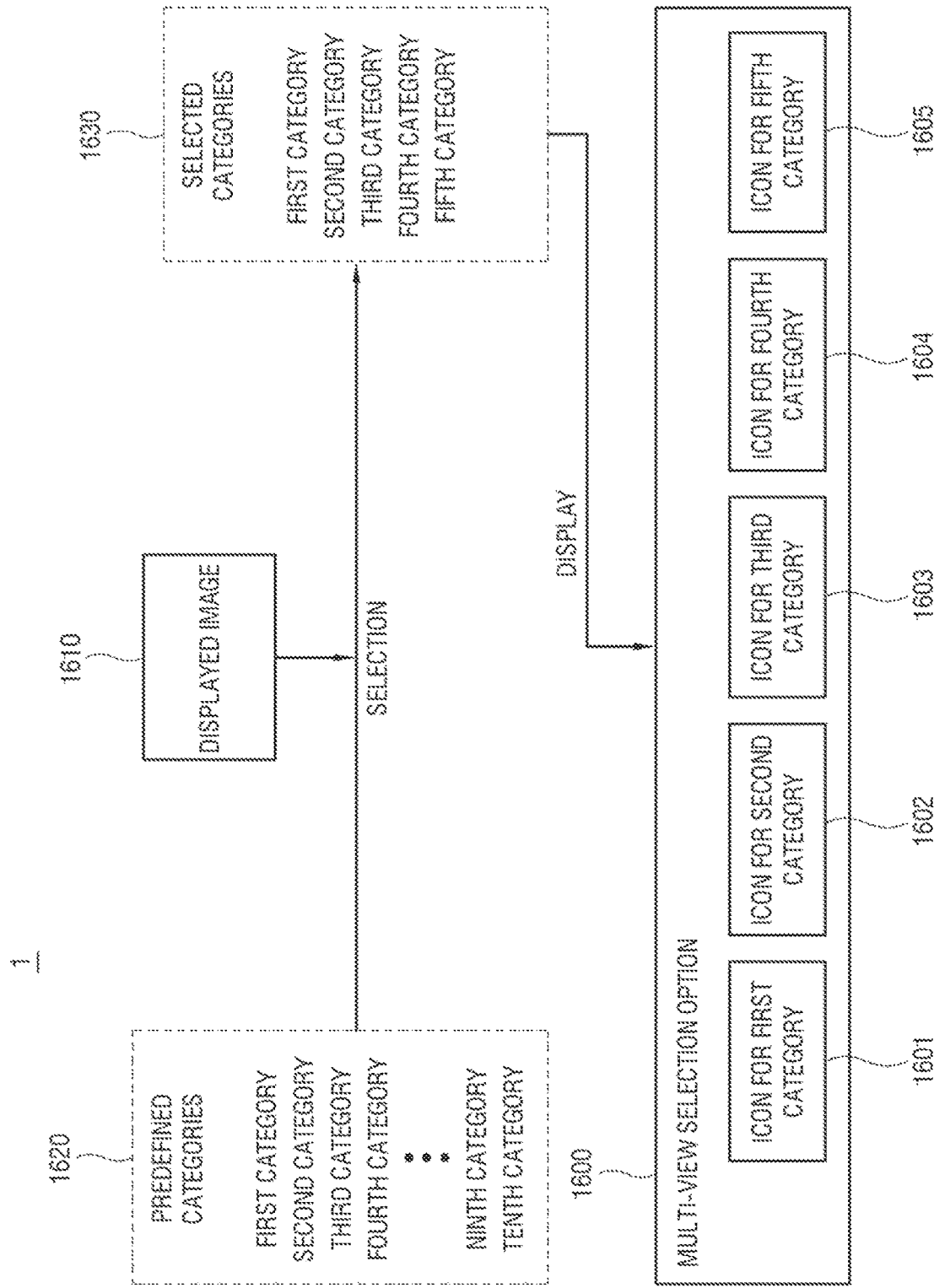

DISPLAY APPARATUS AND CONTROL METHOD THEREOF

CROSS-REFERENCE TO RELATED APPLICATION

This application is a bypass continuation of PCT International Application No. PCT/KR2021/010424, which was filed on Aug. 6, 2021, and claims priority to Korean Patent Application No. 10-2020-0105187, filed on Aug. 21, 2020, in the Korean Intellectual Property Office, the disclosures of which are incorporated herein by reference herein in their entireties.

BACKGROUND

1. Field

The disclosure relates to a display apparatus capable of displaying a multi-view image based on content received from a plurality of source devices, and a method of controlling the display apparatus.

2. Description of Related Art

To compute and process predetermined information in accordance with certain processes, an electronic apparatus includes electronic components such as a central processing unit (CPU), a chipset, a memory, and the like. Such an electronic apparatus may be classified in accordance with what information will be processed and what it is used for. For example, the electronic apparatus includes an information processing apparatus such as a personal computer (PC), a server or the like for processing general information; an image processing apparatus for processing image data; an audio apparatus for audio process; home appliances for miscellaneous household chores; etc. Among the image processing apparatuses, a display apparatus refers to an apparatus including a display panel for displaying an image.

Due to various factors such as development of technology, demand of users, and diversification of use, the screen size of the display apparatus has been increased. As a method of increasing the screen size, there has been proposed a modular display apparatus in which display panels are modularized in a certain size and a plurality of display modules are arranged like tiles to implement a large-sized screen. The modular display apparatus is harmoniously installable in any space because it is assembled to have a screen size and a screen pattern as desired by a user, and thus its application range is gradually expanding. In the case of a general home, a display apparatus may be implemented to entirely occupy a one side wall of a living room.

Such a display apparatus may employ various display methods to utilize a large-sized screen. For example, a display apparatus with a small screen has a practical limitation to the size of a displayed image, thereby employing a method of displaying only an image based on one piece of content and displaying images based on two pieces of content by picture-in-picture (PIP) on the screen. On the other hand, a display apparatus with a large screen may display images based on a plurality of content together by not using the PIP or overlay method but dividing the screen not to overlap each other. For convenience, such a display method will be referred to as a multi-view method.

In terms of displaying a multi-view image, the display apparatus may receive content for a plurality of images to be displayed on the screen from one source device or may receive pieces of content individually from a plurality of source devices. When connecting with the plurality of source devices, the display apparatus is designated with the source device and the content by a user's manual control, thereby displaying a multi-view image. However, this method is inconvenient for a user because the user needs to select pieces of content to be displayed as the multi-view image one by one. In this regard, a display apparatus may be required to display a multi-view image reflecting a user's intention with a user's minimum input.

SUMMARY

According to an aspect of the disclosure, a display apparatus includes: a display; an interface configured to connect to at least one source device from a plurality of source devices connectable to the interface, and receive at least one piece of content from the at least one source device; a user input interface configured to receive a user input; a memory storing instructions; and a processor. The processor is configured to execute the instructions to: based on the user input, select a category from a plurality of categories related to characteristics of the plurality of source devices, receive a plurality of pieces of content from the at least one source device connected to the interface, the at least one source device corresponding to the selected category, and display a multi-image on the display, based on at least two pieces of content from the plurality of pieces of content.

The plurality of categories may correspond to a plurality of types associated with the plurality of source devices.

The processor may be further configured to execute the instructions to: identify the characteristics of the plurality of source devices based on device information received from the plurality of source devices.

The processor may be further configured to execute the instructions to: display a user interface (UI) to select the category from the plurality of categories based on identifying that at least two source devices are connected to the interface.

The processor is further configured execute the instructions to: not display the UI based on identifying that only one source device is connected to the interface.

The processor may be further configured to execute the instructions to: identify selectable categories, from the plurality of categories on the UI, based on characteristics of a content being displayed on the display.

The processor may be further configured to execute the instructions to: store a user setting option comprising at least a first source device and a second source device which are selected by the user, based on identifying that at least two source devices are connected to the interface; and identify the user setting option as a selectable category from the plurality of categories.

The processor may be further configured to execute the instructions to: identify the at least two pieces of content from the plurality of pieces of content, based on a high-to-low order of a content-related ranking of the user.

The content-related ranking of the user may be related to a content preference of the user.

The processor may be further configured to execute the instructions to: identify the content-related ranking based on a content use history of the user.

The processor may be further configured to execute the instructions to: identify the at least two pieces of content from the plurality of pieces of content, based on a viewership rating of the user.

The processor may be further configured to execute the instructions to: identify the viewership rating based on user account information of the display apparatus.

The processor may be further configured to execute the instructions to: identify a layout that corresponds to the selected category, from a plurality of layouts related to a pattern for displaying the multi-image; and display the multi-image based on the identified layout.

The processor may be further configured to execute the instructions to: display the multi-image comprising a main image and a sub image smaller than the main image based on the at least two pieces of content.

According to an aspect of the disclosure, a method of controlling a display apparatus, includes: selecting, based on a user input, a category from a plurality of categories related to characteristics of a plurality of source devices connectable to an interface of the display apparatus; receiving a plurality of pieces of content from at least one source device connected to the interface, the at least one source device corresponding to the selected category; and displaying a multi-image on a display of the display apparatus, based on at least two pieces of content from the plurality of pieces of content.

The method may further include: based on identifying that at least two source devices are connected to the interface, displaying a user interface (UI), on the display, to select the category from the plurality of categories.

The method may further include: based on identifying that at least two source devices are connected to the interface, storing a user setting option comprising at least a first source device and a second source device which are selected by the user, and identifying the user setting option as a selectable category from the plurality of categories.

The method may further include: identifying the at least two pieces of content from the plurality of pieces of content, based on at least one of an order of highest content-related ranking of the user and a viewership rating of the user.

The method may further include: identifying a layout that corresponds to the selected category, from a plurality of layouts related to a pattern for displaying the multi-image; and displaying the multi-image on the display based on the identified layout.

According to an aspect of the disclosure, a non-transitory computer readable medium stores computer readable program code or instructions which are executable by a processor to perform a method for controlling a display apparatus. The method includes: selecting, based on a user input, a category from a plurality of categories related to characteristics of a plurality of source devices connectable to an interface of the display apparatus; receiving a plurality of pieces of content from at least one source device connected to the interface, the at least one source device corresponding to the selected category; and displaying a multi-image on a display of the display apparatus, based on at least two pieces of content from the plurality of pieces of content.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 16 illustrates a display apparatus that changes a category selecting option provided in a UI according to a preset condition, according to an embodiment.

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize aspects of the disclosure by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
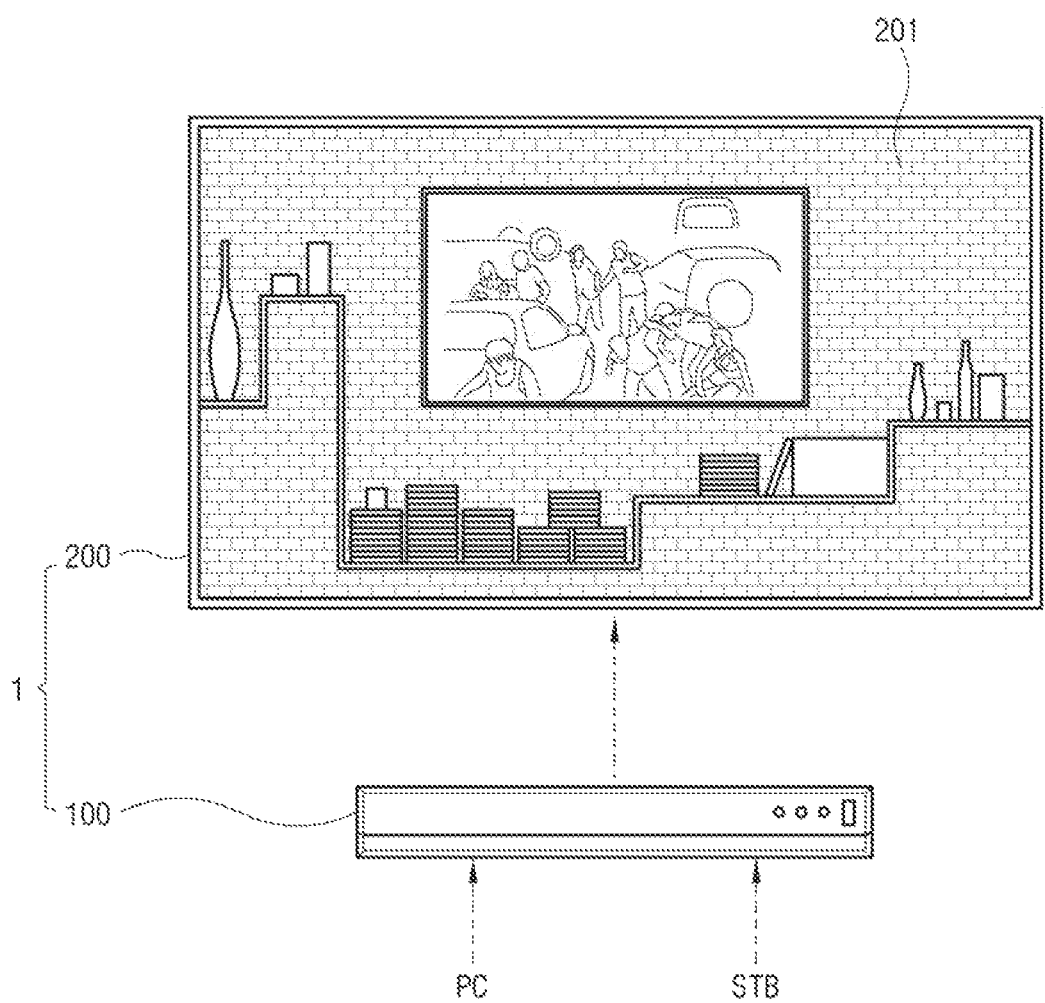
FIG. 1 illustrates a display apparatus, according to an embodiment.

FIG. 1 illustrates a display apparatus, according to an embodiment.

As shown in FIG. 1, a display apparatus 1 according to an embodiment may for example be implemented by a TV. Besides the TV, the display apparatus 1 may be implemented by various types of apparatuses, for example, a monitor, a digital signage, an electronic blackboard, an electronic frame, and the like capable of displaying an image on a screen 201. Here, the screen 201 of the display apparatus 1 is large enough for a plurality of users to watch together.

The display apparatus 1 includes an image processing device 100 for processing an image signal based on image content received from the outside or stored in itself, and a display 200 for displaying an image based on the image signal output from the image processing device 100. According to an embodiment, it will be described that the image processing device 100 of the display apparatus 1 is provided in the form of a media box separated from the display 200, but the structure of the display apparatus 1 is not limited to this embodiment. The display apparatus 1 may be provided as a single entity structure where the image processing device 100 and the display 200 are integrated into one frame or accommodated in one housing.

The image processing device 100 receives an image signal by various communication methods such as performing short range communication with various external apparatuses such as a personal computer (PC), a set-top box, a game console, and a multimedia player; performing a wide area network (WAN) communication with a server; or receiving a radio frequency (RF) broadcast signal. Alternatively, the image processing device 100 may obtain image content data stored in a built-in storage. The image processing device 100 performs decoding, scaling, and the like image-related processing with regard to the obtained image signal and outputs the processed image signal to the display 200. Both wired and wireless methods may be used for signal transmission between the image processing device 100 and the display 200.

The display 200 forms the screen 201 to display an image based on an image signal from the image processing device 100. The display 200 includes a display panel, and various design methods may be applied to the structure of the display panel. For example, the display 200 may include a single display panel, and a backlight unit to emit light the display panel. Alternatively, the display 200 may have a structure where a plurality of micro light emitting diode (LED) modules are combined in the form of tiles to form a large screen 201.

Below, the configuration of the display apparatus 1 will be described.

Figure 2:
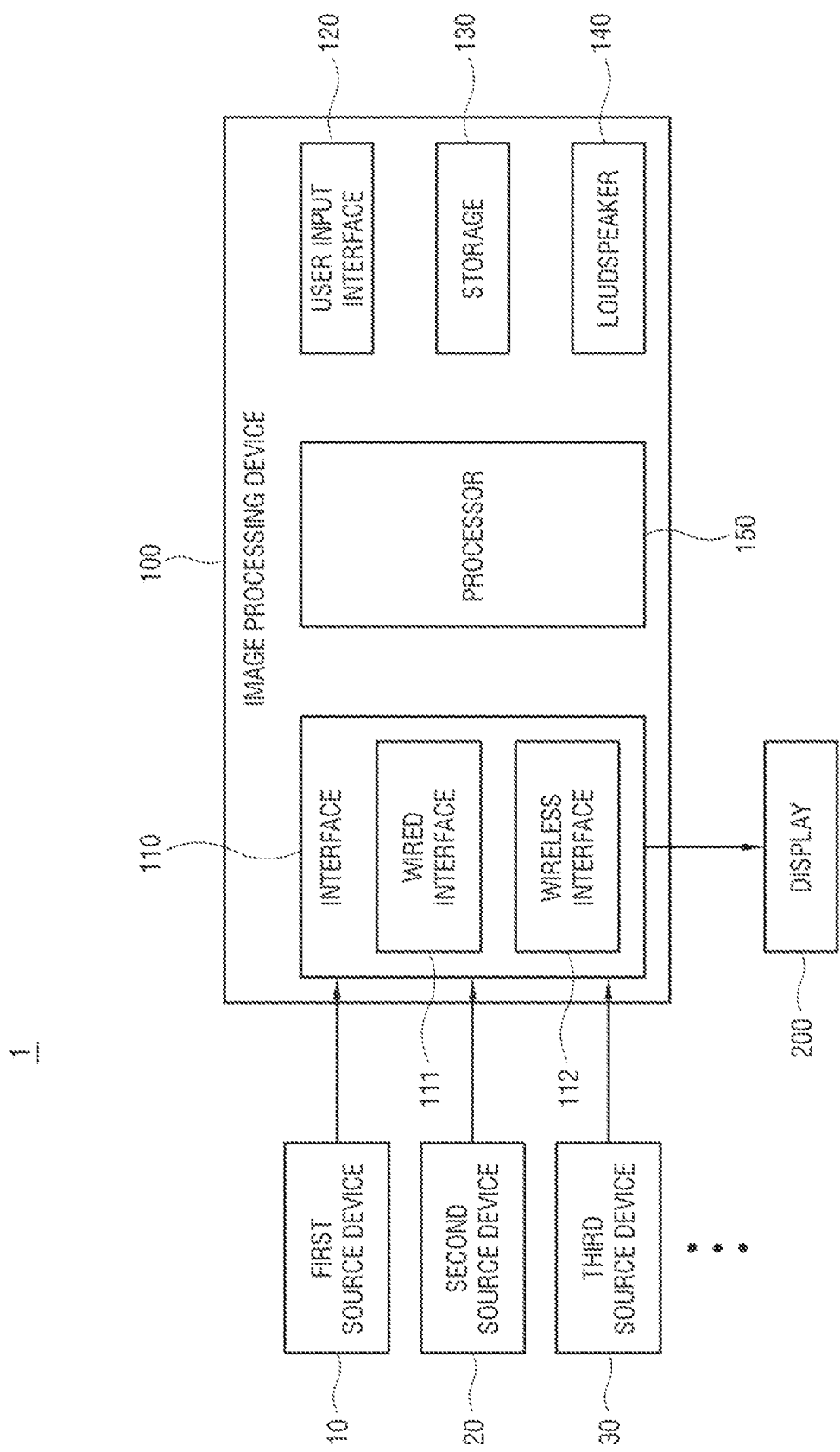
FIG. 2 is a block diagram of a display apparatus, according to an embodiment.

FIG. 2 is a block diagram of a display apparatus, according to an embodiment.

As shown in FIG. 2, the image processing device 100 of the display apparatus 1 includes various hardware elements for operations. The display apparatus 1 according to an embodiment has a structure where the image processing device 100 and the display 200 are separated, but this is merely an example. Alternatively, the display apparatus 1 may have a structure where the image processing device 100 and the display 200 are not separated.

The image processing device 100 may include an interface 110. The interface 110 includes an interface circuit through which the image processing device 100 performs communication with various kinds of external apparatuses and transmits and receives data. The interface 110 may receive image content from the external apparatuses, for example, a plurality of source devices 10, 20, and 30, and output an image content signal processed by a processor 150 to the display 200.

The interface 110 may include one or more wired interfaces 111 for wired communication, and one or more wireless interface 112 for wireless communication according to connection types.

The wired interface 111 includes a connector or port to which a cable of previously defined transmission standards is connected. For example, the wired interface 111 includes a port connecting with a terrestrial or satellite antenna to receive a broadcast signal or connecting with a cable for cable broadcasting. Further, the wired interface 111 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 111 includes a port of universal serial bus (USB) standards to connect with a USB device. Further, the wired interface 111 includes an optical port to which an optical cable is connected. Further, the wired interface 111 includes an audio input port to which an external microphone is connected, and an audio output port to which a headset, an earphone, a loudspeaker etc. is connected. Further, the wired interface 111 includes an Ethernet port connected to a gateway, a router, a hub, etc. for connection with the WAN.

The wireless interface 112 includes an interactive communication circuit including at least one of elements such as a communication module, a communication chip, etc. corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The image processing device 100 may include a user input interface 120. The user input interface 120 includes a circuit related to various kinds of user input interfaces to be controlled by a user to thereby receive a user input. The user input interface 120 may be variously configured according to the kinds of image processing device 100, and may for example include a mechanical or electronic button of the image processing device 100, a touch pad, a sensor, a camera, a touch screen installed in the display 200, a remote controller separated from the image processing device 100, etc.

The image processing device 100 may include a storage 130. The storage 130 is configured to store digitalized data. The storage 130 includes a nonvolatile storage in which data is retained regardless of whether power is supplied or not, and a volatile memory in which data loaded to be processed by a processor 150 is retained only when power is supplied. The storage includes a flash memory, a hard disc driver (HDD), a solid-state drive (SSD), a read only memory (ROM), etc., and the memory includes a buffer, a random-access memory (RAM), etc.

The image processing device 100 may include a loudspeaker 140. The loudspeaker 140 outputs an audio signal processed by the processor 150 as a sound. The loudspeaker 140 may be installed in the image processing device 100, may be installed in the display 200, or may be provided as a separate apparatus. When the loudspeaker 140 is provided as a separate apparatus, the loudspeaker 140 is connected to the image processing device 100 through the interface 110.

The image processing device 100 may include the processor 150. The processor 150 includes one or more hardware processors achieved by a central processing unit (CPU), a chipset, a buffer, a circuit, etc. which are mounted on a printed circuit board (PCB). Alternatively, the processor 150 may be designed as a system on chip (SoC). The processor 150 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC.

According to an embodiment, a plurality of categories related to the characteristics of valid source devices 10, 20, 30, 40, 50, 60, and 70 connectable to the interface 110 is previously defined. When one among the plurality of predefined categories is selected, the processor 150 performs displaying a multi-view image on the display 200 based on the selected category. Below, a method of controlling the display apparatus 1 will be described in detail.

Figure 3:
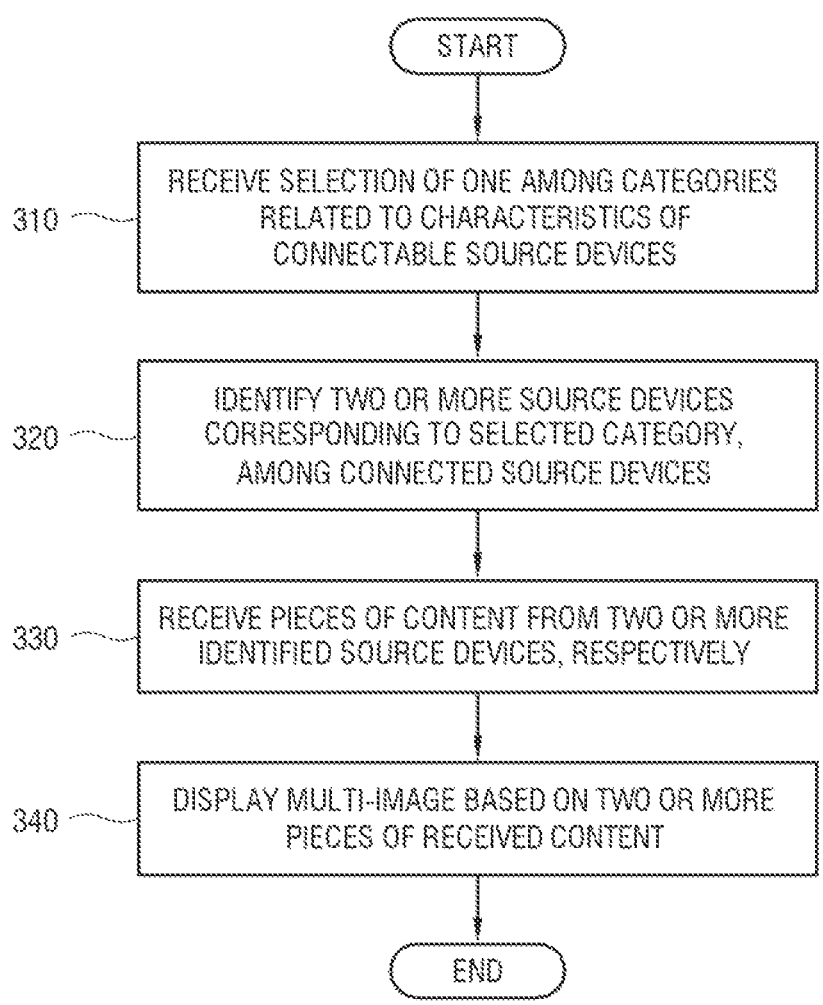
FIG. 3 is a flowchart showing a method of controlling a display apparatus, according to an embodiment.

FIG. 3 is a flowchart showing a method of controlling a display apparatus, according to an embodiment.

As shown in FIGS. 2 and 3, the operations of the display apparatus 1 according to an embodiment is performed by the processor 150.

At operation 310 the display apparatus 1 receives selection of one among the plurality of categories related to the characteristics of the source devices 10, 20, 30, 40, 50, 60, and 70 connectable to the interface 110

At operation 320 the display apparatus 1 identifies two or more source devices 10, 20, 30, 40, 50, 60, and 70 corresponding to the selected category, among the plurality of source devices 10, 20, 30, 40, 50, 60, and 70 connected to the interface 110.

At operation 330 the display apparatus 1 receives pieces of content from the two or more identified source devices 10, 20, 30, 40, 50, 60, and 70 through the interface 110.

At operation 340 the display apparatus 1 displays a multi-image, in other words, the multi-view image, based on the two or more pieces of received content on the display 200.

In this way, the display apparatus 1 recognizes the plurality of connected source devices 10, 20, 30, 40, 50, 60, and 70, and displays the multi-view image based on the two or more source devices 10, 20, 30, 40, 50, 60, and 70 that belong to the same category for each characteristic. Thus, the display apparatus 1 easily and automatically selects the two or more source devices 10, 20, 30, 40, 50, 60, and 70 having the characteristic suitable for a user's intention among the plurality of currently connected source devices 10, 20, 30, 40, 50, 60, and 70, and provide the multi-view image based on the content suitable for a user.

Below, it will be described by way of example that the plurality of source devices 10, 20, 30, 40, 50, 60, and 70 are classified into the plurality of categories corresponding to the characteristics.

Figure 4:
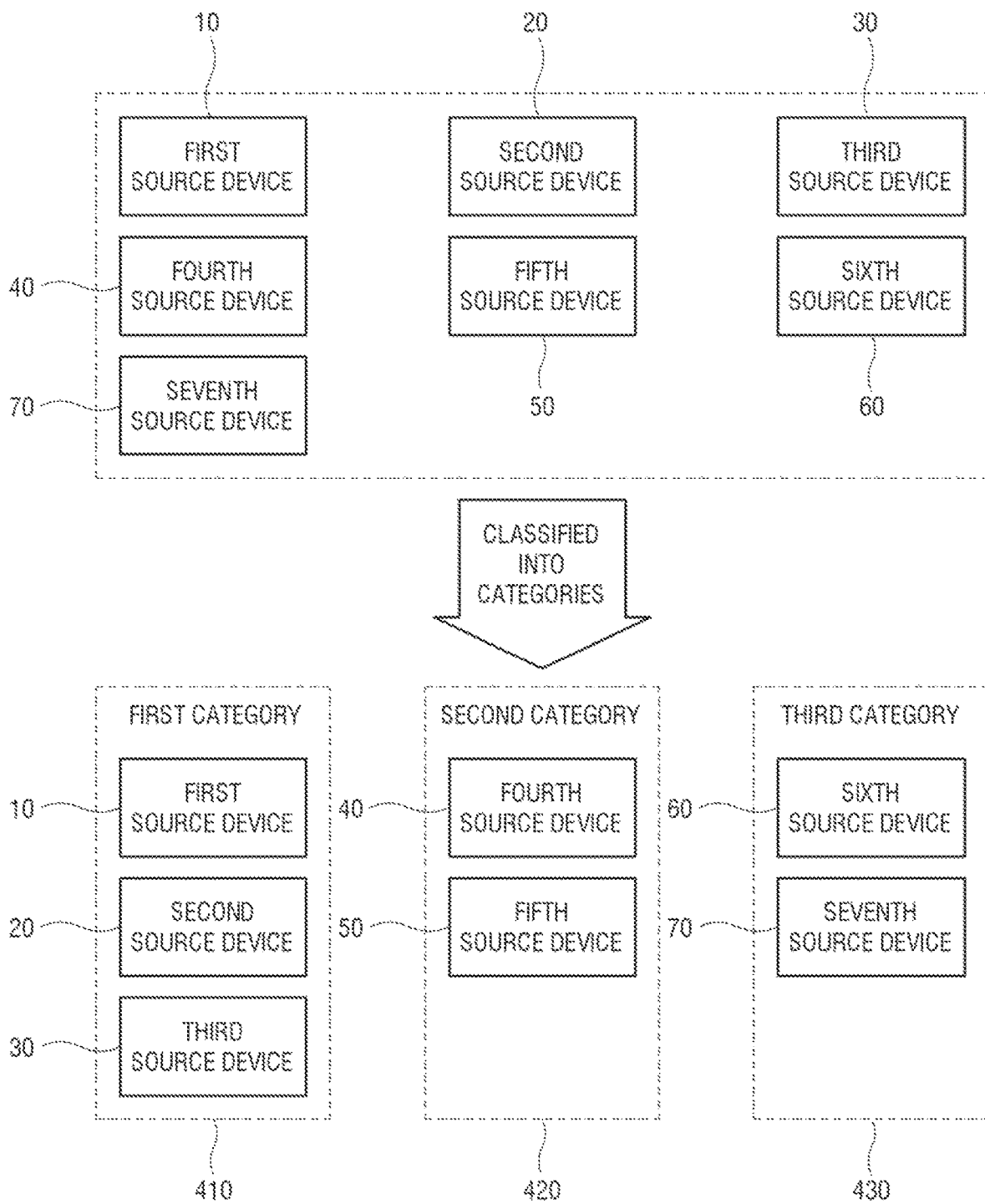
FIG. 4 illustrates a plurality of source devices that are classified into a plurality of categories corresponding to characteristics, according to an embodiment.

FIG. 4 illustrates a plurality of source devices that are classified into a plurality of categories corresponding to characteristics, according to an embodiment.

As shown in FIGS. 2 and 4, when there are the plurality of source devices 10, 20, 30, 40, 50, 60, and 70 connectable to the interface 110, the plurality of categories may be set according to the characteristics of the source devices 10, 20, 30, 40, 50, 60, and 70. The characteristics of the source devices 10, 20, 30, 40, 50, 60, and 70 for classifying the categories may be variously defined, and may, for example, include the device types of the source devices 10, 20, 30, 40, 50, 60, and 70 (e.g., a set-top box, a game console, an audio/video (AV) device, etc.), the transformation standards of the source devices 10, 20, 30, 40, 50, 60, and 70 (e.g., the HDMI, DP, Wi-Fi, etc.), methods of providing content by the source devices 10, 20, 30, 40, 50, 60, and 70 (e.g., a live channel, video on demand (VOD), etc.). Besides, various characteristics may be defined. According to an embodiment, it will be described by way of example that the device types of the source devices 10, 20, 30, 40, 50, 60, and 70 among above various characteristics are used in classifying the categories.

The plurality of source devices 10, 20, 30, 40, 50, 60, and 70 may be classified into the plurality of categories 410, 420, and 430 according to the device types. For example, a first category 410 related to the set-top box, the second category 420 related to the game console, and the third category 430 related to the A/V device may be defined, and the plurality of source devices 10, 20, 30, 40, 50, 60, and 70 belong to any one of the categories 410, 420, and 430 according to the device types. For example, the first source device 10, the second source device 20 and the third source device 30, which are the set-top boxes, belong to the first category 410. The fourth source device 40 and the fifth source device 50, which are the game consoles, belong to the second category 420. The sixth source device 60 and the seventh source device 70, which are the A/V devices, belong to the third category 430. According to an embodiment, one source device 10, 20, 30, 40, 50, 60, or 70 belongs to only one category 410, 420 or 430. Alternatively, one source device 10, 20, 30, 40, 50, 60, or 70 may belong to the plurality of categories 410, 420, and 430. For example, when a predetermined source device serves as both the game console and the A/V device, this source device may belong to both the second category 420 and the third category 430.

The display apparatus 1 identifies which source devices 10, 20, 30, 40, 50, 60, and 70 are connected thereto at a current point in time among the plurality of source devices 10, 20, 30, 40, 50, 60, and 70 classified into the plurality of categories as above. The display apparatus 1 receives device information from the plurality of currently connected source devices 10, 20, 30, 40, 50, 60, and 70, identifies the device ID and characteristics of the corresponding source devices 10, 20, 30, 40, 50, 60, and 70 based on the received device information, and identifies which categories 410, 420 and 430 the source devices 10, 20, 30, 40, 50, 60, and 70 belong to according to the identified characteristics. For example, the display apparatus 1 identifies the first source device 10 belongs to the first category 410 when it is identified that the first source device 10 is connected among the plurality of source devices 10, 20, 30, 40, 50, 60, and 70 and the first source device 10 is identified as the set-top box.

Settings for the plurality of categories 410, 420, and 430 corresponding to the characteristics may be stored in the storage 130 of the display apparatus 1 in various forms such as a table and a list. When one among the plurality of preset categories 410, 420, and 430 is selected for displaying the multi-view image, the display apparatus 1 identifies two or more source devices 10, 20, 30, 40, 50, 60, and 70 corresponding to the selected category 410, 420 or 430. The display apparatus 1 may display a UI provided to allow a user to select a predetermined category 410, 420 or 430, or may automatically select the category 410, 420 or 430 based on a predetermined condition.

Below, it will be described by way of example that the display apparatus 1 receives a user's selection of a predetermined category 410, 420 or 430 through the UI.

Figure 5:
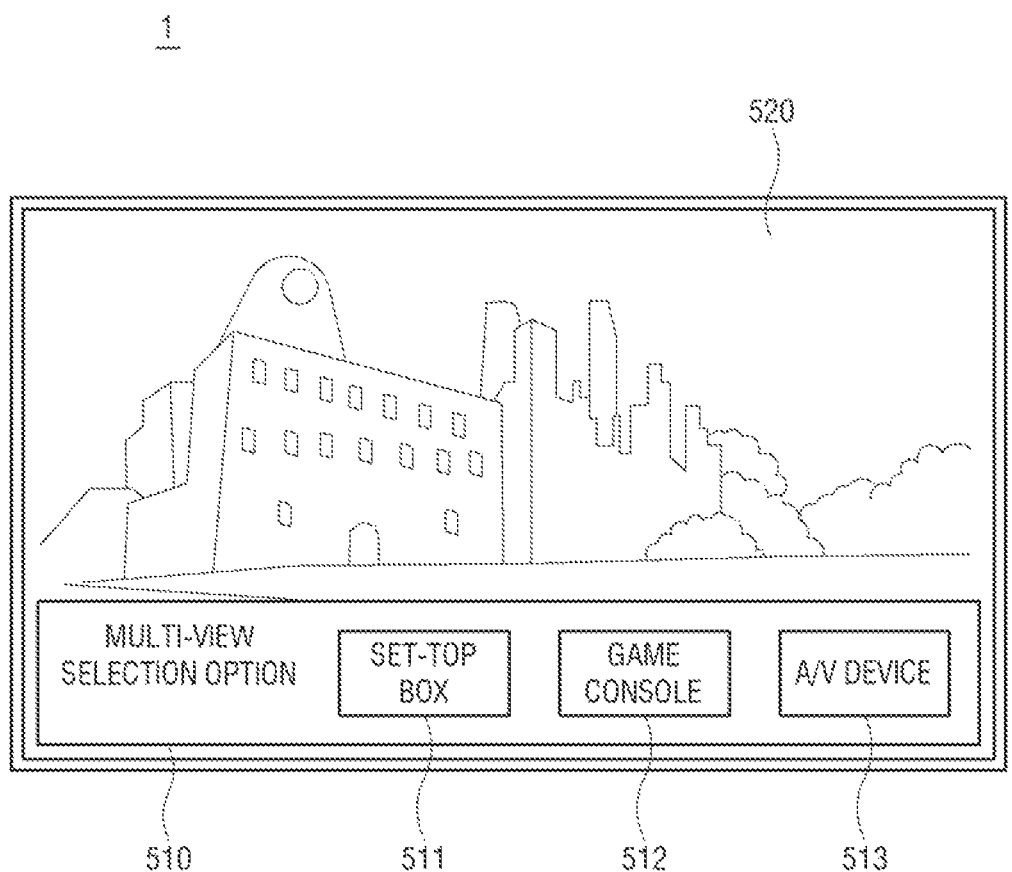
FIG. 5 illustrates a display apparatus that displays a user interface (UI) provided to select a category on a screen, according to an embodiment.

FIG. 5 illustrates a display apparatus that displays a UI provided to select a category on a screen, according to an embodiment.

As shown in FIG. 5, when a user's preset input is detected during operation, the display apparatus 1 may display a UI 510 provided to select the plurality of categories according to the predefined characteristics of the source device. There are no limits to a point in time at which the display apparatus 1 can display the UI 510 during the operation. The display apparatus 1 may display the UI 510 on an image 520 based on certain content being displayed. Alternatively, the display apparatus 1 may display the UI 510 on a standby screen while displaying the standby screen, or may display the UI 510 instead of the standby screen.

When only one source device is connected to the display apparatus 1, there are no needs of classifying the plurality of source devices according to the categories. Therefore, the display apparatus 1 does not display the UI 510 even though a user's input is received.

The display apparatus 1 displays options corresponding to the plurality of categories as icons 511, 512, and 513 or the like object on the UI 510. According to an embodiment, the UI 510 includes an icon 511 corresponding to the set-top box category, an icon 512 corresponding to the game console category, and an icon 513 corresponding to the A/V device category. Alternatively, the icons 511, 512, and 513 may be varied depending on the categories. According to an embodiment, the UI 510 includes the icons 511, 512, and 513, but the object corresponding to the category is not limited to only the icon 511, 512 or 513. Such an object may be variously implemented by a text, a thumbnail image, etc.

When a user selects one among the plurality of icons 511, 512, and 513 through the UI 510, the display apparatus 1 identifies two or more source devices corresponding to the category of the selected the icons 511, 512, and 513 among the plurality of currently connected source devices. For example, when the icon 511 of the set-top box category is selected, the display apparatus 1 identifies two or more source devices corresponding to the set-top box category among the currently connected source devices.

The display apparatus 1 receives content from the two or more source devices corresponding to the selected category, and displays a multi-view image based on the received content. Here, when the number of pieces of content received from the corresponding source devices is large, the display apparatus 1 selects pieces of content to be displayed as the multi-view image according to a predefined criterion. In this regard, an embodiment will be described below.

Figure 6:
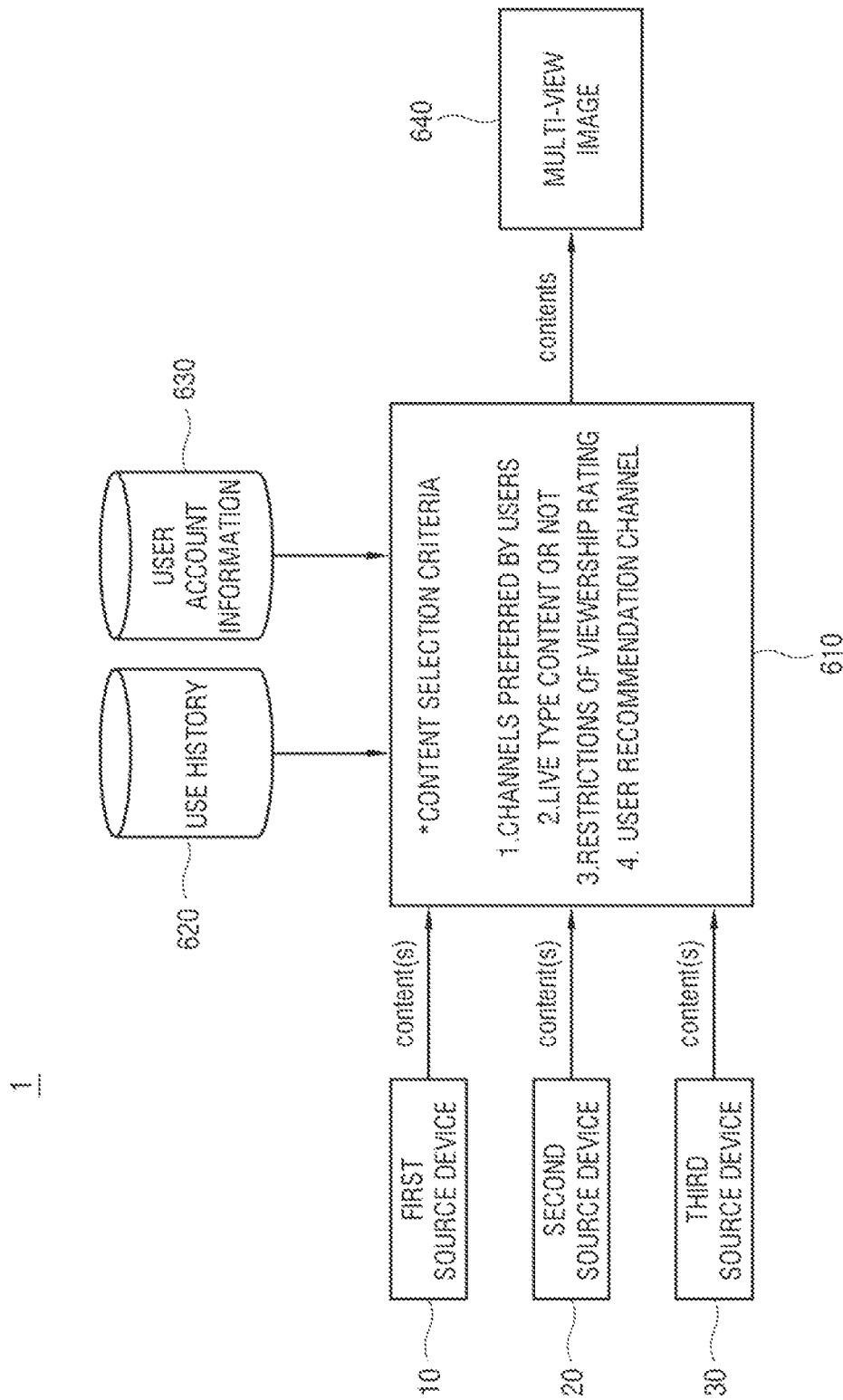
FIG. 6 illustrates a display apparatus that selects content for a multi-view among pieces of content received from two or more source devices, according to an embodiment.

FIG. 6 illustrates a display apparatus that selects content for a multi-view among pieces of content received from two or more source devices, according to an embodiment.

As shown in FIG. 6, when two or more source devices 10, 20 and 30 corresponding to a selected category are identified, the display apparatus 1 receives pieces of content from these source devices 10, 20, and 30. The number of pieces of content received from one of the source devices 10, 20, and 30 may be singular or plural. For example, when the source devices 10, 20, and 30 are multimedia players, the source devices 10, 20, and 30 output only currently playing content, and therefore the number of pieces of content received from each of the source devices 10, 20, and 30 is singular. On the other hand, when the source devices 10, 20, and 30 are set-top boxes, the source devices 10, 20, and 30 output broadcast streams corresponding a plurality of broadcast channels, and therefore the number of pieces of content received from each of the source devices 10, 20, and 30 is plural.

When the number of pieces of content received from two or more source devices 10, 20 and 30 is greater than the number of images to be displayed as a multi-view image 640 by the display apparatus 1, the display apparatus 1 selects content to be displayed as the multi-view image 640 among the pieces of received content. In this process, a preset content selection criterion 610 is applied.

The content selection criterion 610 may be variously designated. For example, when the source devices 10, 20, and 30 are the set-top boxes that provide broadcast channels, the display apparatus 1 may select a channel or program highly preferred by a user of the corresponding display apparatus 1. In this case, the display apparatus 1 may check preference rankings of channels or programs based on a use history 620 that a user has used the display apparatus 1 in watching content, and select the channel and program in order of highest preference ranking. The highest ranking may be based on various parameters such as how many times a certain channel or program has been selected, and how long a certain channel or program has been viewed.

Alternatively, the display apparatus 1 may select content of a live broadcast among given pieces of content. The content may include live type content unilaterally transmitted to the display apparatus 1 at a time designated by a content provider, and VOD type content obtained and viewed by a user at any time. The live type content is not viewable when a user misses a content broadcasting time, but the VOD type content is viewable at any time as desired by a user. Thus, the live type content may be selected taking the foregoing point into account.

Alternatively, the display apparatus 1 may select content based on restrictions of viewership ratings. The viewership ratings are based on various criteria, for example, a classification of adults and minors, a classification of a rating allowed to view paid content and a rating not allowed to view the paid content, etc. The display apparatus 1 may select content based on the viewership rating of a user recorded in user account information 630.

Alternatively, the display apparatus 1 may select content based on a preset user recommendation channel. Such a user recommendation channel may, for example, may include channels recommended by a content provider according to a user's characteristics (for example, age, gender, nationality, residence, job, etc.). The display apparatus 1 may select content suitable for a user's characteristics designated by a content provider, based on the user's characteristics recorded in the user account information 630. Besides several examples described above, the display apparatus 1 may select content based on various content selection criteria 610.

The processor 150 (see FIG. 2) of the display apparatus 1 may perform at least a part of data analysis, processing, and result information generation based on at least one of machine learning, a neural network, or a deep learning algorithm as a rule-based or artificial intelligence (AI) algorithm in order to set the content selection criteria 610 as above, or select the content based on the content selection criteria 610. Here, the AI is not applied to the foregoing operations, but may be applied to general operations described in an embodiment of the disclosure (for example, an operation of automatically selecting one among the plurality of categories with a user's input).

The processor of the display apparatus 1 may function as a learner and a recognizer. The learner may perform a function of generating the trained neural network, and the recognizer may perform a function of recognizing (or inferring, predicting, estimating and identifying) the data based on the trained neural network. The learner may generate or update the neural network. The learner may obtain learning data to generate the neural network. For example, the learner may obtain the learning data from the storage of the display apparatus 1 or from the outside. The learning data may be data used for training the neural network, and the data subjected to the foregoing operations may be used as the learning data for training the neural network.

Before training the neural network based on the learning data, the learner may perform a preprocessing operation with regard to the obtained learning data or select data to be used in the training among a plurality of pieces of the learning data. For example, the learner may process the learning data to have a preset format, apply filtering to the learning data, or process the learning data to be suitable for the training by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may obtain target data to carry out the foregoing operations. The target data may be obtained from the storage of the display apparatus 1 or from the outside. The target data may be data targeted to be recognized by the neural network. Before applying the target data to the trained neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The display apparatus 1 displays the multi-view image 640 based on two or more pieces of content selected according to the content selection criterion 610. The display apparatus 1 may display the multi-view image 640 in various forms. Below, an example of displaying the multi-view image 640 will be described.

Figure 7:
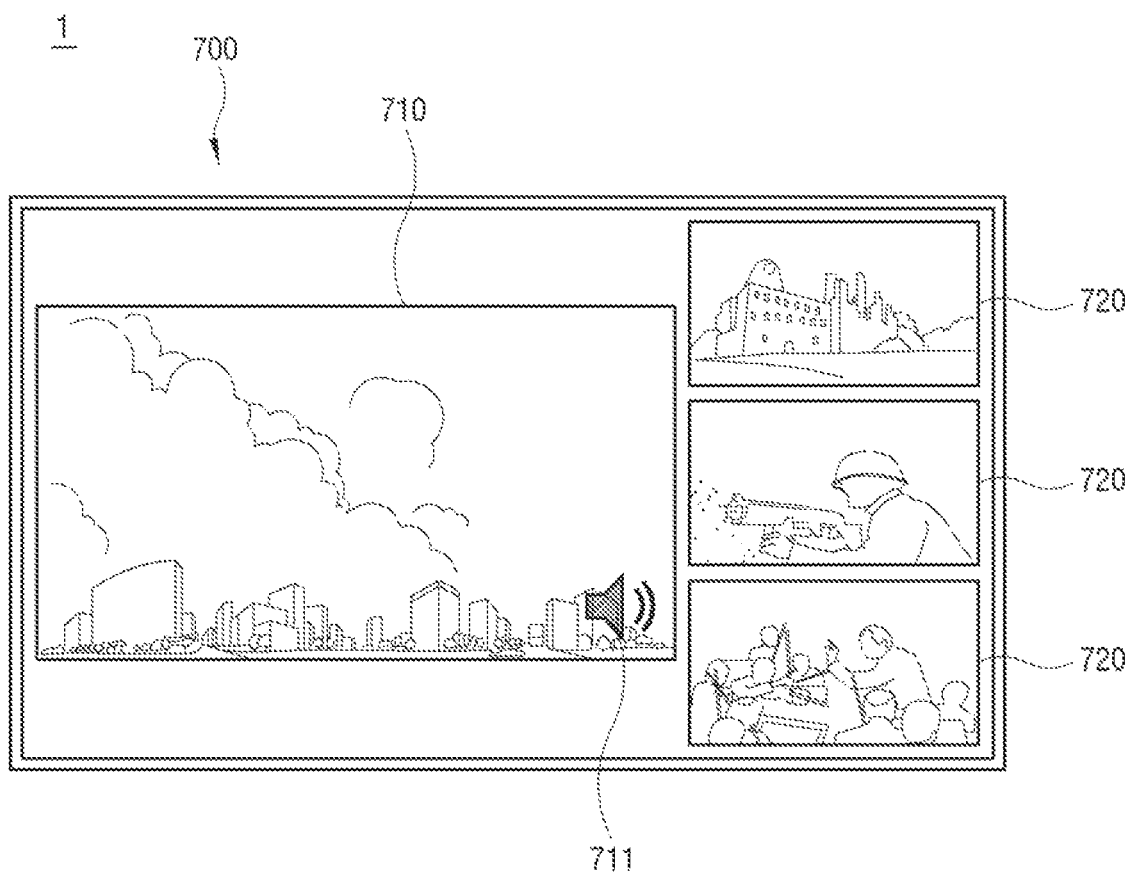
FIG. 7 illustrates a display apparatus that displays a multi-view image having a layout in the form of a main image and a sub image, according to an embodiment.

FIG. 7 illustrates a display apparatus that displays a multi-view image having a layout in the form of a main image and a sub image, according to an embodiment.

As shown in FIG. 7, the display apparatus 1 displays a multi-view image 700 in which images 710 and 720 based on two or more pieces of identified content are displayed together. According to an embodiment, for pieces of content are identified, and thus the multi-view image 700 includes four pieces of images 710 and 720. However, the number of pieces of identified content may be any natural number not less than two, and therefore the number of images 710 and 720 included in the multi-view image 700 may be varied.

According to an embodiment, the multi-view image 700 has a layout in the form of a main image and a sub image, and includes one relatively large main image 710, and a plurality of relatively small sub images 720. There may be various methods of select content to be displayed as the main image 710 among a plurality of pieces of identified content. For example, when content of an image 520 (see FIG. 5) of when the UI 510 (see FIG. 5) is displayed is identified as the plurality of content, the display apparatus 1 displays the corresponding identified content as the main image 710. Alternatively, when content is identified based on the ranking, the display apparatus 1 may display the content of the top ranking as the main image 710.

The plurality of sub images 720 may have the same size as in an embodiment, but may be designed to be different in size from one another. For example, the sizes of the plurality of sub images 720 may correspond to the rankings of the identified content. When content from the first to fourth places in the user preference ranking is identified, the display apparatus 1 may display the content corresponding to the first place in the ranking as the main image 710, and set the size of a content image corresponding to the second place to be larger than the sizes of content images corresponding to the third or fourth place in the plurality of sub images 720.

In the multi-view image 700, the positions of the main image 710 and the sub images 720 may be designated variously. In the multi-view image 700, the display apparatus 1 according to an embodiment may display the main image 710 on the left, and the plurality of sub images 720 on the right. The display apparatus 1 may display the main image 710 at various positions such as the right, upper, left and center positions in the multi-view image 700, and the sub images 720 may be appropriately positioned according to the positions of the main image 710.

The display apparatus 1 may play back all the pieces of content as the images 710 and 720 within the multi-view image 700, or may play back some pieces of content as the images, for example, only the content corresponding to the main image 710. The display apparatus 1 displays a mark indicating the playback on the images 710 and 720 being currently played back. Further, when content with audio is played back simultaneously, it may confuse a user. Therefore, the display apparatus 1 plays back the audio of content corresponding to any one of the images in the multi-view image 700, for example, the audio of content corresponding to the main image 710, and displays a mark 711 indicating the audio playback on the main image 710. According to an embodiment, the mark 711 may inform a user not only that the main image 710 is being played back but also that the sound of the main image 710 is output.

Figure 8:
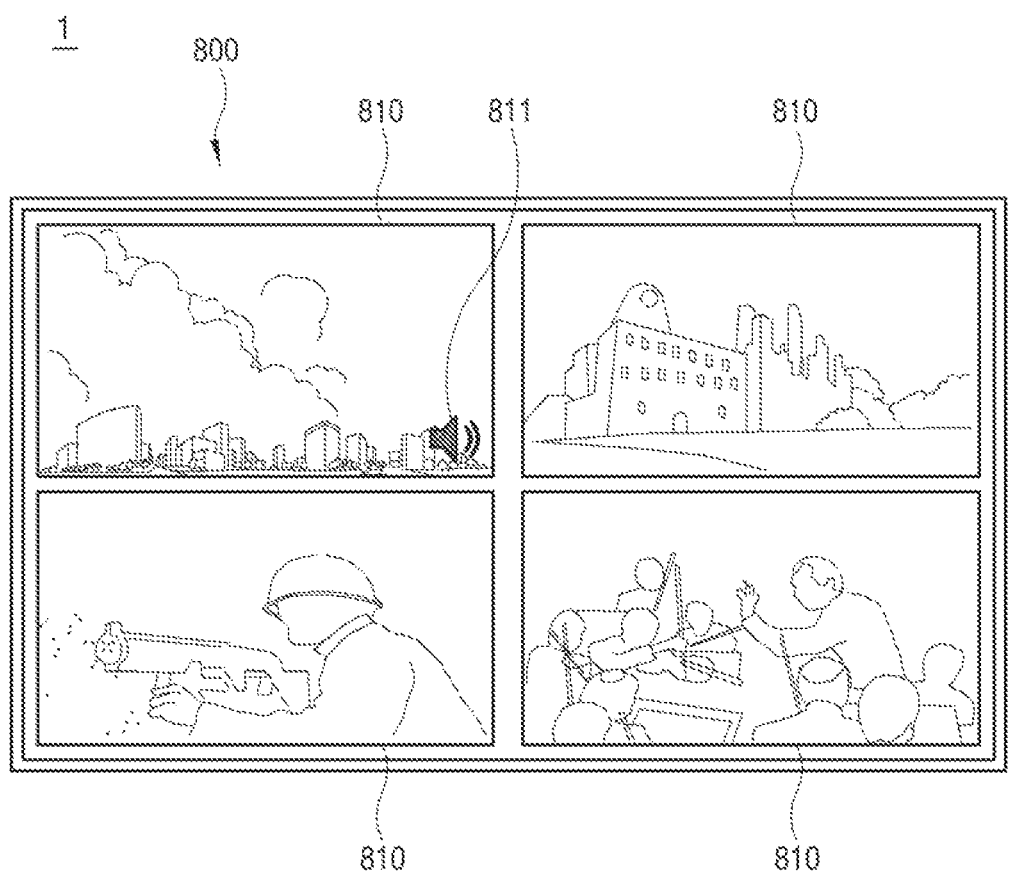
FIG. 8 illustrates a display apparatus that displays a multi-view image having a layout in the form of equalized images, according to an embodiment.

FIG. 8 illustrates a display apparatus that displays a multi-view image having a layout in the form of equalized images, according to an embodiment.

As shown in FIG. 8, the display apparatus 1 displays a multi-view image 800 in which images 810 are displayed together based on two or more pieces of identified content. According to an embodiment, the multi-view image 800 has a layout in an equalized image form where all the images 810 have the same size. According to an embodiment, four images 810 are displayed within the multi-view image 800, and these images 810 have the same size and are arranged symmetrically within the multi-view image 800. Of course, the number, size and position of the images 810 within the multi-view image 800 are merely examples, and not limited thereto.

The display apparatus 1 may display the mark 811 indicating the playback or sound output on the image 810 being currently played back or currently outputting a sound among the plurality of images 810 within the multi-view image 800.

As the layout of the multi-view image 700 shown in FIG. 7 is different from the layout of the multi-view image 800 shown in FIG. 8, a more appropriate layout may be applied. Below, it will be described by way of example that the display apparatus 1 selects a layout.

Figure 9:
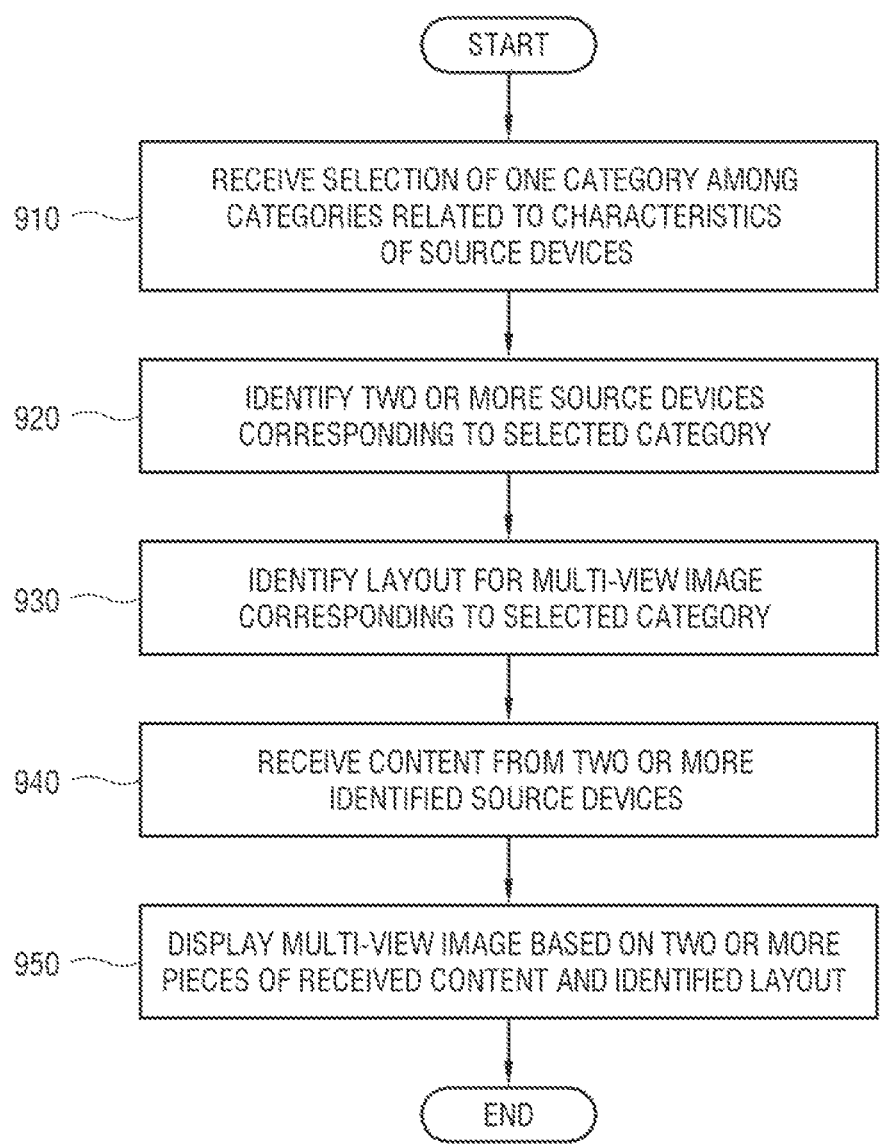
FIG. 9 is a flowchart showing a display apparatus that selects a layout for a multi-view image, according to an embodiment.

FIG. 9 is a flowchart showing a display apparatus that selects a layout for a multi-view image, according to an embodiment.

As shown in FIGS. 2 and 9, the following operations are performed by the processor 150 of the display apparatus 1.

At operation 910 the display apparatus 1 receives selection of one category among the plurality of categories related to the characteristics of the source devices 10, 20, 30, 40, 50, 60, and 70.

At operation 920 the display apparatus 1 identifies two or more source devices 10, 20, 30, 40, 50, 60, and 70 corresponding to the selected category, among the plurality of source devices connected to the interface 110.

At operation 930 the display apparatus 1 identifies the layout for the multi-view image corresponding to the selected category.

At operation 940 the display apparatus 1 receives content from the two or more source devices 10, 20, 30, 40, 50, 60, and 70.

At operation 950 the display apparatus 1 displays the multi-view image based on the two or more pieces of received content and the identified layout.

For example, the foregoing operations may be implemented as follows. In the layout of the multi-view image 700 as shown in FIG. 7, the main image 710 is relatively large, and it is thus relatively easier to pay attention to the main image 710 even when the multi-view image 700 is viewed by several people at the same time. Therefore, this layout is suitable for moving image content or broadcast content. On the other hand, in the layout of the multi-view image 800 as shown in FIG. 8, the plurality of images 810 have the same size. Therefore, this layout is suitable for a case where a plurality of users pay attention to different images 810, respectively, for example, suitable for multi-play of game content. When a plurality of game consoles is connected to the display apparatus 1, the display apparatus 1 may display the images 810 respectively corresponding to the game consoles in the multi-view image 800. Thus, the users of the game consoles can play the games while viewing the images 810 corresponding to their game consoles, respectively.

For example, the display apparatus 1 selects the layout of the multi-view image 700 as shown in FIG. 7 when the category selected among the plurality of categories is related to the characteristics of the set-top box. On the other hand, the display apparatus 1 selects the layout of the multi-view image 800 as shown in FIG. 8 when the category selected among the plurality of categories is related to the characteristics of the game console. In this way, the display apparatus 1 uses the layout suitable for the selected category, thereby providing a more optimized multi-view image.

When the source devices 10, 20, 30, 40, 50, 60, and 70 are the game consoles that require server interworking, the display apparatus 1 may perform operations as follows.

FIGS. 10, 11, 12, and 13 illustrate multi-view images displayed by a display apparatus connected with two game consoles, according to an embodiment.

Figure 10:
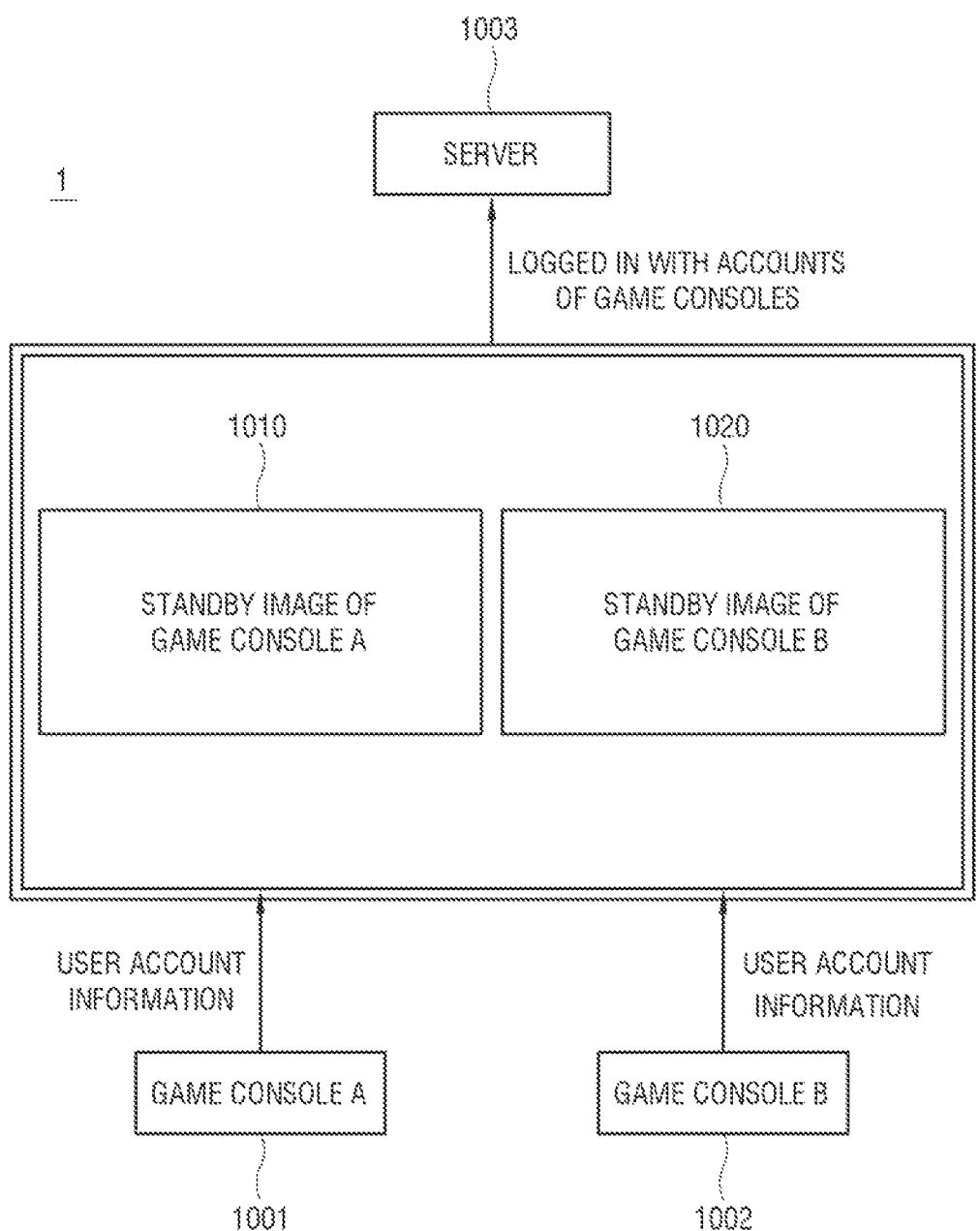
FIGS. 10, 11, 12, and 13 illustrate multi-view images displayed by a display apparatus connected with two game consoles.

As shown in FIG. 10, when the category of the game console is selected, the display apparatus 1 identifies a game console A 1001 and a game console B 1002 among a plurality of source devices connected thereto. According to an embodiment, two users of the game console A 1001 and the game console B 1002 intend to play a multi-play game by interworking with a server 1003.

When the game console A 1001 and the game console B 1002 are connected to the display apparatus 1, the display apparatus 1 first displays a multi-view image including a standby image 1010 of the game console A 1001 and a standby image 1020 of the game console B 1002. At this point in time, the game has not been executed yet in any of the game console A 1001 and the game console B 1002.

The display apparatus 1 obtains the user account information from each of the game console A 1001 and the game console B 1002, and connects with the server 1003 based on this information. The game console A 1001 and the game console B 1002 are logged in to the server 1003 with their own accounts. Thus, the server 1003 recognizes that the game console A 1001 and the game console B 1002 are connected thereto.

Below, it will be described that the user of the game console A 1001 executes a predetermined game in the game console A 1001.

Figure 11:
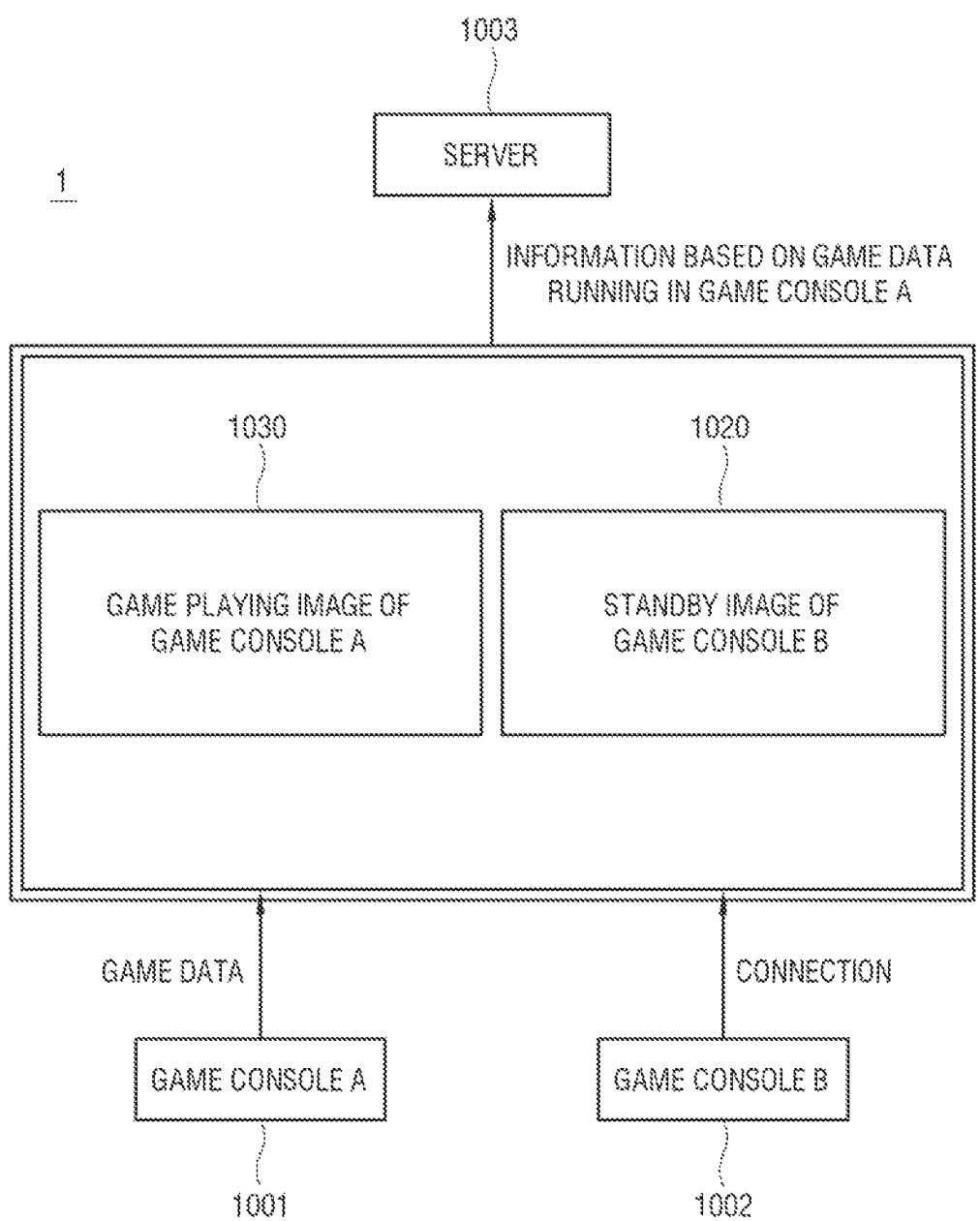

As shown in FIG. 11, when a predetermined game is played in the game console A 1001, the game console A 1001 transmits play data of the corresponding game to the display apparatus 1. The display apparatus 1 displays a game playing image 1030 of the game console A in the multi-view image based on game data received from the game console A 1001. On the other hand, game data is not received from the game console B 1002, and the display apparatus 1 maintains displaying the standby image of the game console B.

The display apparatus 1 transmits predetermined information abased on the game data received from the game console A 1001 to the server 1003. Here, the game data the display apparatus 1 receives from the game console A 1001 may be the same as or different from the information the display apparatus 1 transmits to the server 1003, but the information is at least based on the game data. For example, the game data the game console A 1001 transmits to the display apparatus 1 may include both information to be transmitted to the server 1003 for playing the game, and information needed for the display apparatus 1 to display the game playing image 1030 but not required to be transmitted to the server 1003. In this case, the display apparatus 1 may identify some information designated to be transmitted to the server 1003 from among the received game data, and transmit the identified information to the server 1003. This information may for example include the ID of the game running in the game console A 1001.

Thus, the server 1003 may identify which game is currently running in the game console A 1001.

In terms of managing user accounts and games, the server 1003 may identify a plurality of user accounts set to perform multi-play for a specific game. For example, the server 1003 may identify that the multi-play for the game currently running in the game console A 1001 is set to be allowed in the game console B 1002. In this regard, the operations of the server 1003 will be described below.

Figure 12:
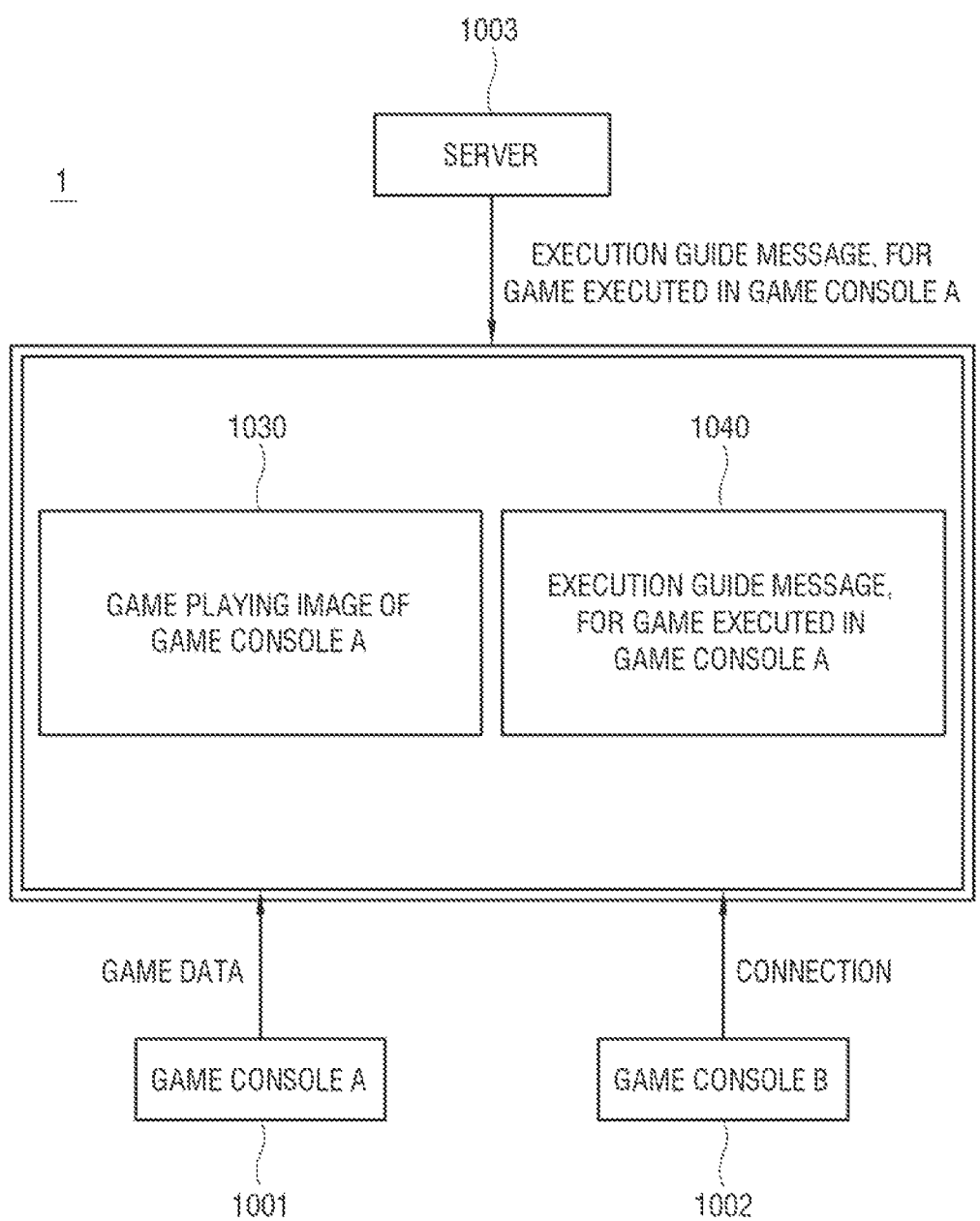

As shown in FIG. 12, when it is identified that a predetermined game is running in the game console A 1001, the server 1003 identifies whether the multi-play for the corresponding game is allowed in the game console B 1002. Alternatively, when the game console A 1001 is logged on with a user A's account and the game console B 1002 is logged on with a user B's account, the server 1003 may identify whether the user B can do the multi-play for the corresponding game with the user A. Alternatively, the server 1003 may search for the user B in a list of user accounts set to do the multi-play for the corresponding game together with the user A.

When it is identified that the multi-play for the corresponding game is not allowed in the game console B 1002, the image 1020 of FIG. 11 is maintained. On the other hand, when it is identified that the multi-play for the corresponding game is allowed in the game console B 1002, the server 1003 transmits a message to the display apparatus 1 so as to guide the user B of the game console B 1002 to do the multi-play for the corresponding game together with the user A. Thus, the display apparatus 1 displays the multi-view image including the message 1040 together with the game playing image 1030 of the game console A. Alternatively, the server 1003 may transmit not the message but an instruction for executing the corresponding game to the display apparatus 1. In this case, the display apparatus 1 may transmit the instruction for executing the game to the game console B 1002, and the game console B 1002 may automatically execute the game in response to the received instruction.

In this way, the user B can recognize that the user A is playing the corresponding game through the message 1040 displayed on the display apparatus 1.

Figure 13:
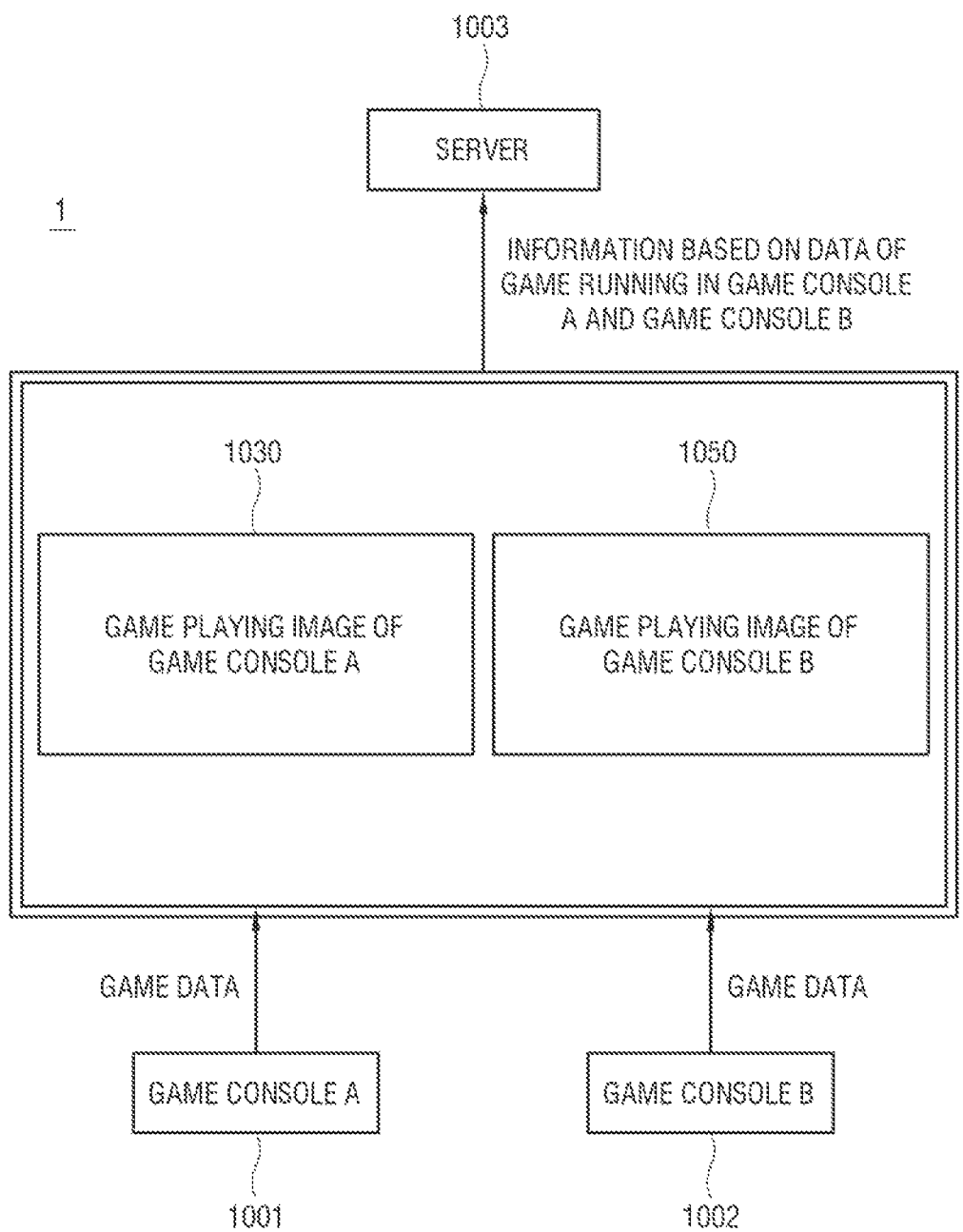

As shown in FIG. 13, the user B may recognize that the user A is playing a predetermined game through a guide on the multi-view image displayed on the display apparatus 1, and execute the guided game in the game console B 1002.

The game console B 1002 transmits the game data of the corresponding game to the display apparatus 1, and the display apparatus 1 displays the multi-view image including an image 1030 of the game running in the game console A 1001 and an image 1050 of the game running in the game console B 1002. Further, the display apparatus 1 transmits information based on the game data obtained from each of the game console A 1001 and the game console B 1002 to the server 1003. Thus, the server 1003 may relay and control the multi-play of the user A and the user B for the game running in each of the game console A 1001 and the game console B 1002 based on the received information.

According to the foregoing embodiment, in particular, FIG. 5 illustrates that the display apparatus 1 displays the UI 510 including the icons 511, 512, and 513 corresponding to the plurality of predefined categories and providing an option for selecting one of the categories. When a user selects one of the icons 511, 512, and 513, two or more source devices corresponding to the category of the selected icon 511, 512 or 513 are identified. Alternatively, a user may select source devices in each category in person and store results of the selection as settings, and the display apparatus 1 may provide the settings as an option to the user. In this regard, an embodiment will be described below.

Figure 14:
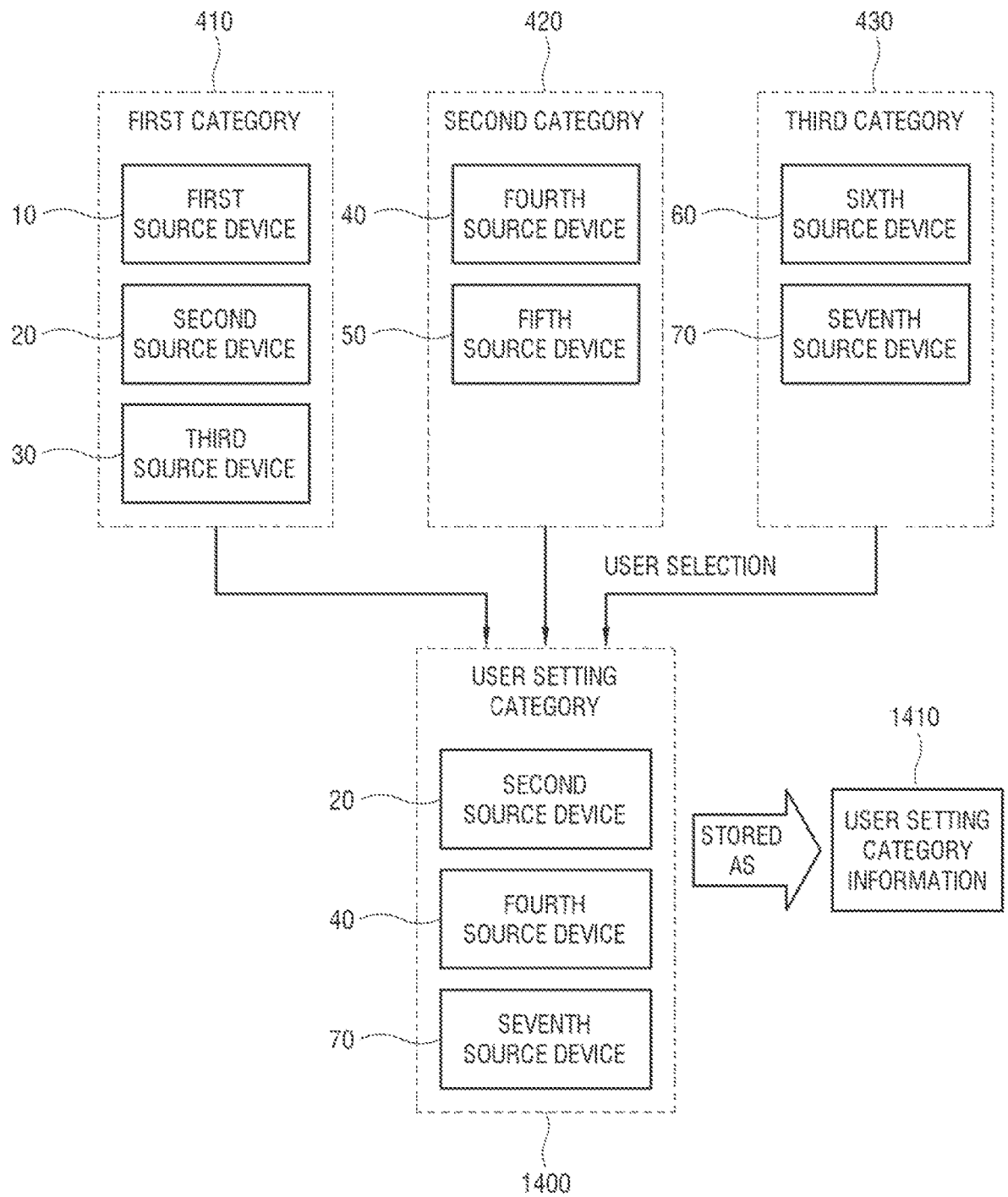
FIG. 14 illustrates a user that selects source devices in a plurality of predefined categories in a display apparatus, according to an embodiment.

FIG. 14 illustrates a user that selects source devices in a plurality of predefined categories in a display apparatus, according to an embodiment.

As shown in FIG. 14, the plurality of source devices 10, 20, 30, 40, 50, 60, and 70 are set corresponding to the plurality of categories 410, 420, and 430 in advance. For example, the first source device 10, the second source device 20 and the third source device 30 belong to the first category 410, the fourth source device 40 and the fifth source device 50 belong to the second category 420, and the sixth source device 60 and the seventh source device 70 belong to the third category 430.

A user may randomly select two or more source devices 10, 20, 30, 40, 50, 60, and 70 among the source devices 10, 20, 30, 40, 50, 60, and 70 classified as above according to the categories. For example, a user may select the second source device 20 corresponding to the first category 410, the fourth source device 40 corresponding to the second category 420, and the seventh source device 70 corresponding to the third category 430 among the source devices 10, 20, 30, 40, 50, 60, and 70 connected to the display apparatus 1. The result of this selection will be referred to as a user setting category 1400.

The display apparatus 1 stores such a newly generated user setting category 1400 as user setting category information 1410.

Figure 15:
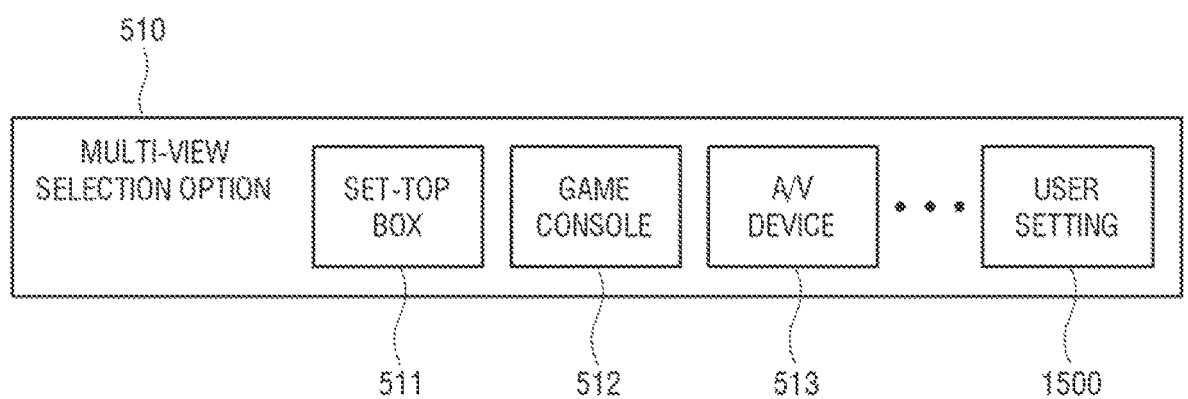
FIG. 15 illustrates a user setting icon that is included in a UI for selection of a multi-view image, according to an embodiment.

FIG. 15 illustrates a user setting icon that is included in a UI for selection of a multi-view image, according to an embodiment.

As shown in FIGS. 14 and 15, the display apparatus 1 displays the UI 510 provided to select the category. The UI 510 includes the plurality of icons 511, 512, and 513 corresponding to the categories related to the characteristics of the source devices. This configuration is substantially the same as that in the foregoing embodiment shown in FIG. 5.

According to an embodiment, the UI 510 further includes a user setting icon 1500. The user setting icon 1500 corresponds to the user setting category 1400 indicating two or more source devices selected by a user, and displayed based on the user setting category information 1410. The display apparatus 1 refers to the user setting category information 1410 when displaying the UI 510, and does not display a user setting icon 1500 on the UI 510 when the user setting category information 1410 is not stored.

When the user setting icon 1500 is selected on the UI 510, the display apparatus 1 identifies two or more source devices corresponding to the user setting category 1400 as indicated by the user setting category information 1410, and displays a multi-view image based on content from the two or more identified source devices. For example, when the user setting category 1400 corresponds to the second source device 20, the fourth source device 40 and the seventh source device 70, the display apparatus 1 may display the multi-view image based on the content received from the second source device 20, the fourth source device 40 and the seventh source device 70.

The display apparatus 1 may change the options of categories selectable by a user on the UI 510 according to various conditions. In this regard, an embodiment will be described below.

FIG. 16 illustrates a display apparatus that changes a category selecting option provided in a UI according to a preset condition, according to an embodiment.

As shown in FIG. 16, the display apparatus 1 may select the categories of a plurality of icons 1601, 1602, 1603, 1604 and 1605 based on conditions of a current use environment when displaying the plurality of icons 1601, 1602, 1603, 1604 and 1605 on a UI 1600. Here, various conditions are applicable. As an example, the display apparatus 1 may select the categories based on characteristics of content being currently played back, i.e., content of an image 1610 being currently displayed. The characteristics of the content may, for example, be implemented by various factors such as content genre (sports, drama, news, movie, etc.), and content type (live, VOD, etc.). The characteristics of the content may be obtained from metadata provided along with the content, or content-related information (electronic program guide (EPG), etc.) provided through various paths.

This method may be applied when the number of icons 1601, 1602, 1603, 1604 and 1605 displayed on the UI 1600 is less than the number of predefined categories 1620. For example, when five icons 1601, 1602, 1603, 1604 and 1605 are displayable on the UI 1600 and ten categories 1620 from the first to tenth categories are defined in advance, the display apparatus 1 selects five categories 1630, which are based on the characteristics of the content of the image 520 being currently displayed, among the ten categories 1620, and displays the icons 1601, 1602, 1603, 1604 and 1605 corresponding to the five selected categories 1630 on the UI 1600.

As an example according to an embodiment, it will be taken into account that the content of the image 1610 being currently displayed is a sports game. The display apparatus 1 may select the category of the set-top box for providing a sports broadcast in the same time slot as the content of the image 1610, and the category of the game console for playing game, based on the characteristics of the content of the image 1610, i.e., two factors of "sports" and "game."

According to an alternative embodiment, when receiving pieces of content from two or more source devices corresponding to the category selected through the UI 1600, the display apparatus 1 may select two or more pieces of content to be displayed as the multi-view image based on the characteristics of the content of the image 1610 being currently displayed among the pieces of received content.

For example, it will be assumed that the display apparatus 1 selects the category of the set-top box through the UI 1600 and the image 1610 being currently displayed is a sports live broadcast. In this case, the display apparatus 1 may select channels, which correspond to the sport live broadcasts in a current time slot, among broadcast receiving channels of two or more source devices corresponding to the set-top box, thereby displaying the content images of the selected channels as the multi-view image.

The operations of the apparatus described above in the foregoing embodiments may be performed by artificial intelligence installed in the apparatus. The artificial intelligence may be applied to various systems based on machine learning algorithms. The artificial intelligence system refers to a computer system that implements human-level intelligence or near human-level intelligence, in which a machine, device or system autonomously learns and makes a decision, and a recognition rate and a decision accuracy are improved based on accumulated use experiences. Artificial intelligence technology is based on elementary technology by utilizing machine learning technology and algorithms using an algorithm of autonomously classifying/learning features of input data to copy perception, determination and the like functions of a human brain.

The elementary technology may for example include at least one of linguistic comprehension technology for recognizing a language/text of a human, visual understanding technology for recognizing an object like a human sense of vision, deduction/prediction technology for identifying information and logically making deduction and prediction, knowledge representation technology for processing experience information of a human into knowledge data, and motion control technology for controlling a vehicle's automatic driving or a robot's motion.

Here, the linguistic comprehension refers to technology of recognizing and applying and processing a human's language or character, and includes natural language processing, machine translation, conversation system, question and answer, speech recognition and synthesis, etc.

The deduction/prediction refers to technology of identifying information and logically making prediction, and includes knowledge and possibility-based deduction, optimized prediction, preference-based plan, recommendation, etc.

The knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

What is claimed is:

1. A display apparatus comprising:
   a display;
   an interface;
   a user input interface;
   a memory storing instructions; and
   at least one processor configured to execute the instructions to:
      based on a user input through the user input interface, select a category from a plurality of categories related to characteristics of a plurality of source devices connectable to the interface;
      identify two or more source devices corresponding to the selected category, among a plurality of source devices connected to the interface;
      identify at least two pieces of content from a plurality of pieces of content which are provided by the identified two or more source devices, based on a content-related ranking of a user; and
      display, on the display, a multi-image based on the at least two pieces of content.

2. The display apparatus of claim 1, wherein the plurality of categories correspond to a plurality of types associated with the plurality of source devices.

3. The display apparatus of claim 1, wherein the at least one processor is further configured to execute the instructions to identify the characteristics of the plurality of source devices based on device information received from the plurality of source devices.

4. The display apparatus of claim 1, wherein the at least one processor is further configured to execute the instructions to display, on the display, a user interface (UI) to select the category from the plurality of categories based on identifying that at least two source devices are connected to the interface.

5. The display apparatus of claim 4, wherein the at least one processor is further configured execute the instructions to not display the UI based on identifying that only one source device is connected to the interface.

6. The display apparatus of claim 4, wherein the at least one processor is further configured to execute the instructions to identify selectable categories, from the plurality of categories on the UI, based on characteristics of a content being displayed on the display.

7. The display apparatus of claim 1, wherein the at least one processor is further configured to execute the instructions to:
store a user setting option comprising at least a first source device and a second source device which are selected by the user, based on identifying that at least two source devices are connected to the interface; and
identify the user setting option as a selectable category from the plurality of categories.

8. The display apparatus of claim 1, wherein the at least one processor is further configured to execute the instructions to identify the at least two pieces of content from the plurality of pieces of content, based on a high-to-low order of the content-related ranking of the user.

9. The display apparatus of claim 1, wherein the content-related ranking of the user is related to a content preference of the user.

10. The display apparatus of claim 1, wherein the at least one processor is further configured to execute the instructions to identify the content-related ranking based on a content use history of the user.

11. The display apparatus of claim 1, wherein the at least one processor is further configured to execute the instructions to identify the at least two pieces of content from the plurality of pieces of content, based on a viewership rating of the user.

12. The display apparatus of claim 11, wherein the at least one processor is further configured to execute the instructions to identify the viewership rating based on user account information of the display apparatus.

13. The display apparatus of claim 1, wherein the at least one processor is further configured to execute the instructions to:
identify a layout that corresponds to the selected category, from a plurality of layouts related to a pattern for displaying the multi-image; and
display, on the display, the multi-image based on the identified layout.

14. The display apparatus of claim 13, wherein the at least one processor is further configured to execute the instructions to display, on the display, the multi-image comprising a main image and a sub image smaller than the main image based on the at least two pieces of content.

15. A method of controlling a display apparatus, the method comprising:
selecting, based on a user input, a category from a plurality of categories related to characteristics of a plurality of source devices connectable to an interface of the display apparatus;
identifying two or more source devices corresponding to the selected category, among a plurality of source devices connected to the interface;
identifying at least two pieces of content from a plurality of pieces of content which are provided by the identified two or more source devices, based on a content-related ranking of a user; and
displaying a multi-image on a display of the display apparatus, based on the at least two pieces of content.

16. The method of claim 15, further comprising:
based on identifying that at least two source devices are connected to the interface, displaying, on the display, a user interface (UI) to select the category from the plurality of categories.

17. The method of claim 15, further comprising:
based on identifying that at least two source devices are connected to the interface, storing a user setting option comprising at least a first source device and a second source device which are selected by the user; and
identifying the user setting option as a selectable category from the plurality of categories.

18. The method of claim 15, further comprising:
identifying the at least two pieces of content from the plurality of pieces of content, based on at least one of an order of highest content-related ranking of the user and a viewership rating of the user.

19. The method of claim 15, further comprising:
identifying a layout that corresponds to the selected category, from a plurality of layouts related to a pattern for displaying the multi-image; and
displaying the multi-image on the display based on the identified layout.

20. A non-transitory computer readable medium for storing computer readable program code or instructions which are executable by a processor to perform a method for controlling a display apparatus, the method comprising:
selecting, based on a user input, a category from a plurality of categories related to characteristics of a plurality of source devices connectable to an interface of the display apparatus;
identifying two or more source devices corresponding to the selected category, among a plurality of source devices connected to the interface;
identifying at least two pieces of content from a plurality of pieces of content which are provided by the identified two or more source devices, based on a content-related ranking of a user; and
displaying a multi-image on a display of the display apparatus, based on the at least two pieces of content.

* * * * *